US005704323A

United States Patent [19]
Gardell et al.

[11] Patent Number: 5,704,323
[45] Date of Patent: Jan. 6, 1998

[54] ARRANGEMENT IN - AND METHOD FOR STARTING - AN INTERNAL COMBUSTION ENGINE

[75] Inventors: Lars Gardell, Stockholm; Günter Friedel, Enhörna, both of Sweden

[73] Assignee: Scania CV Aktiebolag, Sodertalje, Sweden

[21] Appl. No.: 652,443

[22] PCT Filed: Dec. 7, 1994

[86] PCT No.: PCT/SE94/01176

§ 371 Date: Jun. 5, 1996

§ 102(e) Date: Jun. 5, 1996

[87] PCT Pub. No.: WO95/16115

PCT Pub. Date: Jun. 15, 1995

[30] Foreign Application Priority Data

Dec. 8, 1993 [SE] Sweden .................................. 9304076

[51] Int. Cl.$^6$ .......................... F02N 17/04; F02B 37/04; F02B 37/11
[52] U.S. Cl. ........................ 123/179.3; 123/179.3; 60/607; 60/612
[58] Field of Search .................. 123/179.3, 179.18, 123/179.21, 179.1, 562, 565; 60/607, 608, 612

[56] References Cited

U.S. PATENT DOCUMENTS

| | | | |
|---|---|---|---|
| 3,676,999 | 7/1972 | Oldfield | 60/606 |
| 4,232,521 | 11/1980 | Gali Mallofre | 60/612 |
| 4,462,348 | 7/1984 | Giardini | 123/179.1 |

FOREIGN PATENT DOCUMENTS

| | | |
|---|---|---|
| 0312107 | 4/1989 | European Pat. Off. . |
| 0367406 | 5/1990 | European Pat. Off. . |
| 779615 | 11/1980 | U.S.S.R. ............ 123/179.21 |

OTHER PUBLICATIONS

Patent Abstracts of Japan, vol. 14, No. 355, M-1004, abstract of JP, A, 2-123242 (Isuzu Motors Ltd), 10 May 1990.

*Primary Examiner*—Andrew M. Dolinar
*Attorney, Agent, or Firm*—Ostrolenk, Faber, Gerb & Soffen, LLP

[57] ABSTRACT

Arrangement and method for an internal combustion engine (2), preferably a vehicle engine (2) provided with a turbo unit (14), whereby a compressed air device (18), preferably a compressor driven by an electric motor, builds up the charging pressure and thereby raises the air temperature in the engine combustion chamber (4) before the engine (2) starts. The result is a reduction in the environmentally harmful discharges which may otherwise occur when starting, owing to incomplete combustion.

14 Claims, 1 Drawing Sheet

5,704,323

ARRANGEMENT IN - AND METHOD FOR STARTING - AN INTERNAL COMBUSTION ENGINE

BACKGROUND OF THE INVENTION

The present invention relates to an arrangement in an internal combustion engine and a method for starting an internal combustion engine.

A large proportion of environmentally harmful discharges from internal combustion engines takes place during and immediately after the starting phase. The most important reason for this is that this operating situation often involves incomplete combustion due to disadvantageous fuel/air ratio or to the air temperature in the cylinders being too low. A particular problem occurs in heavy vehicles with diesel engines, such as trucks, in which this may often lead to discharges in the form of so called white smoke exhaust. This white smoke contains hydrocarbons and consists mainly of unburnt fuel. Since combustion is temperature dependent, the problem is particularly obvious at cold starting of vehicles.

Many vehicles today are provided with turbo charged engines. In such engines the exhaust gases drive a turbine which in its turn drives a compressor which supplies the combustion space with air. The result is a higher charging pressure in the cylinders whereby a greater fuel quantity may be injected, with a consequently higher power output. When starting the vehicle, however, there will be a certain time lag between increased exhaust gas flow and increased charging pressure, the so called "turbo lag", during which time incomplete combustion may occur.

EP 367 406 describes a solution for reducing this time lag, whereby the compressor may also be driven by an electrical machine in order to be able to increase the charging pressure as quickly as possible during acceleration of the vehicle from starting. Under this solution and other similar earlier known solutions, build up of the charging pressure begins as soon as the engine starts, which does not solve discharge problems which occur at the moment of starting and during the period before the charging pressure and air temperature build up.

SUMMARY OF THE INVENTION

The present invention has the object of supplying compressed air to a cylinder of an internal combustion engine prior to starting the engine, without involving excessively expensive or complicated constructional modifications.

This is achieved by having a compressed air device build up the desired charging pressure, and hence also cause a temperature rise, before the engine starts.

Particularly great discharge reductions are achieved in applications for cold starting of diesel engine driven vehicles where the engine is of the so called direct injection type, i.e. where the fuel is injected directly into the engine combustion chamber.

According to an advantageous embodiment, the compressor on a vehicle provided with a turbo unit is driven by an electric motor before the starting of the vehicle's engine, with the object of increasing the charging pressure.

According to another advantageous embodiment, a second electric motor driven compressor is arranged in series with the ordinary compressor driven by the exhaust gas turbine and is arranged to start before the engine.

The invention has the further object of providing a method for starting an internal combustion engine, whereby the advantages described above are achieved.

Further features and advantages of the invention are indicated by the description below of an embodiment with reference to the attached drawings.

DETAILED DESCRIPTION OF PREFERRED EMBODIMENT(S)

Figure 1:
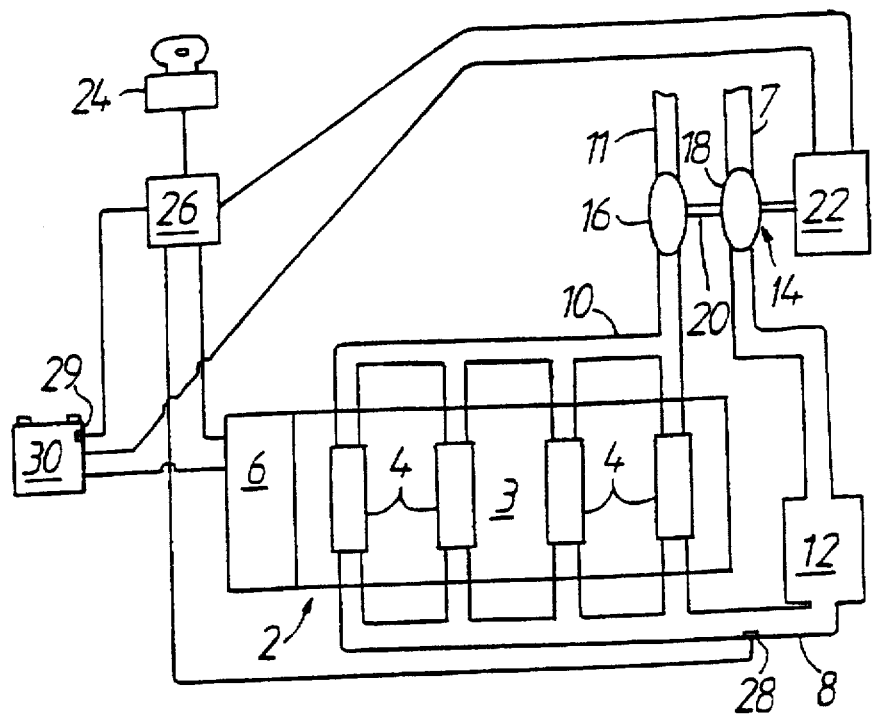
FIG. 1 shows a schematic drawing of a vehicle internal combustion engine and its air intake and exhaust gas systems.

FIG. 1 shows a schematic drawing of an internal combustion engine 2 and its air inlet and exhaust gas systems.

The engine 2 is here a diesel engine belonging to a truck and incorporates an engine block 3 with a number of combustion chambers 4, preferably in the form of cylinders, four of which are here depicted. The engine 2 is provided with an electric starter motor 6 for use in a conventional manner in starting the engine 2. The cylinders 4 are also provided with injection orifices (not depicted) via which fuel is supplied to the cylinders 4.

The air inlet system, which is conventional, consists of an intake pipe 7 which is connected to a compressor 18 which forms part of a turbo unit 14. From the compressor the air is led to the cylinders 4 of the engine 2 via an inlet duct 8, here in the form an inlet pipe, which incorporates a charge cooler 12 with the object of cooling the air before it is led into the engine 2, since in normal operation the air would otherwise be too hot.

The exhaust gas system, which is also conventional, consists of an exhaust gas manifold 10 which connects the cylinders 4 of the engine 2 to a turbine 16 which forms part of the turbo unit 14. From the turbine the exhaust gases are led out via an exhaust pipe 11.

The turbo unit 14 thus incorporates the turbine 16 and the compressor 18, which are arranged on a common shaft 20. The turbo unit 14 has the conventional function of increasing the charging pressure in the cylinders 4 so that a greater fuel quantity may be injected, with consequent extraction of a greater power output. This is achieved by the exhaust gases being led through the turbine 16 which via the shaft 20 drives the compressor 18 which via the inlet pipe 8 supplies the cylinders 4 with pressurised air, thereby increasing the charging pressure and hence also the temperature.

According to the invention the compressor 18 is also provided with an electrical machine 22 which is connected to the vehicle's ordinary, battery 30 and which constitutes a second drive source for the compressor 18. The electrical machine 22 receives signals via a control device 26 from an activating device 24 intended to be operated by the driver when he wishes to start the vehicle engine 2. The activating device 24 advantageously takes the form of an ordinary ignition lock. The starter motor 6 also receives signals from the control device 26.

The vehicle engine 2 is started in the following manner:

The driver turns the ignition key 24, resulting in a signal being transmitted to the control device 26 which transmits a signal to the electrical machine 22, which starts running, thereby driving the compressor 18 which increases the air pressure in the cylinders 4 and hence also increases the air temperature. When a sensoring device 28 (here in the form of a temperature sensor in the inlet pipe 8) which is connected to the control device 26 detects that a predetermined temperature is reached, the control device 26 gives a signal to the starter motor 6, which starts running, thereby also starting the engine 2. The sensoring device 28 may of course be placed at any other point where the temperature can be measured. It likewise need not necessarily be a temperature sensor, since it is for example possible to use a means of detecting that a certain pressure is reached or that a certain time has elapsed since the electrical machine 22 started running. This time is preferably set such that it may with good probability be assumed that a sufficiently high temperature will be reached.

The electric motor 22 need not necessarily start running every time the vehicle starts. It may advantageously be arranged to start running only on the occasion of cold starts, which may be defined by the temperature sensor detecting an air temperature below a predetermined value, e.g. −5° C.

On the occasion of a cold start, the ease with which the vehicle starts is clearly increased by the air temperature being raised by some ten degrees. The electric motor 22 may then switch off when the starter motor 6 switches off. Another alternative is to have the electric motor 22 switch off when the exhaust gas turbine 16 reaches a certain predetermined rotation speed.

The result of the foregoing is a solution whereby, in contrast to known solutions, the charging pressure builds up and the air temperature rises even before the engine starts, thereby reducing the aforesaid discharges.

Figure 2:
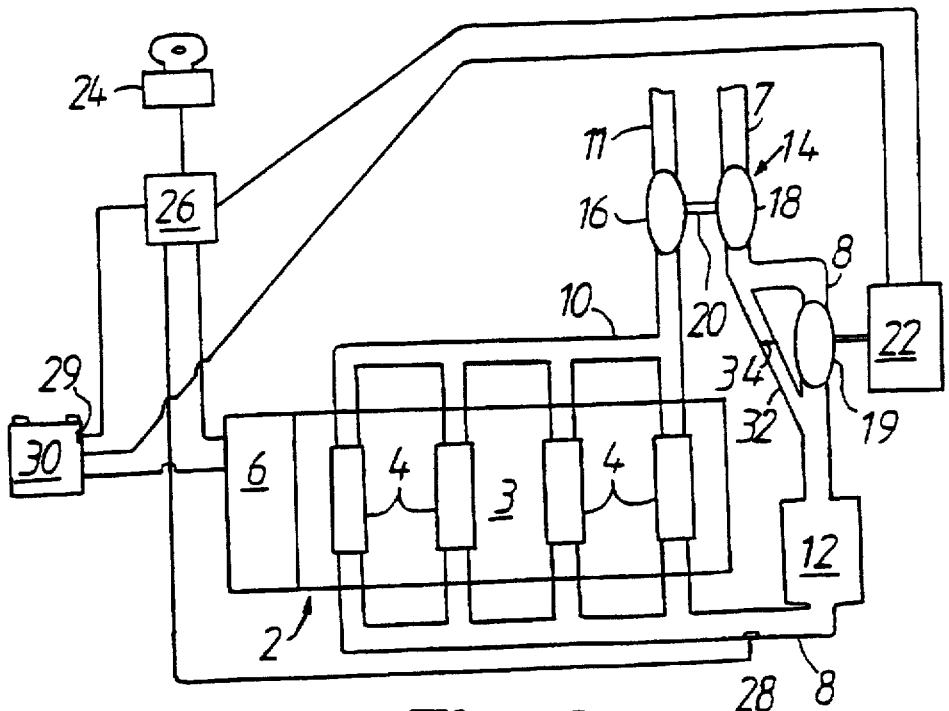
FIG. 2 shows a schematic drawing of an alternative embodiment.

FIG. 2 depicts an alternative embodiment in which a second compressor 19 is connected to the inlet pipe 8 between the ordinary compressor 18 and the cylinders 4. This second compressor 19 has the electrical machine 22 as its sole drive source. There is also a bypass pipe 32 which incorporates a throttle 34. The second compressor 19 may also be connected to the intake pipe 7 before the ordinary compressor. When the electrical machine 22 drives the second compressor 19, the throttle 34 is closed so that all the air is led through the compressor 19. When the electrical machine is not running, the throttle 34 is open so that the air is led past the second compressor 19, which would otherwise cause a pressure drop. Operation in other respects corresponds to the first embodiment described.

The invention may also be applied to engines with twin inlet ducts, in which case the second compressor 19 may be arranged to act on only one of the inlet ducts.

To limit pressure drops and temperature drops, a similar bypass pipe may be used to lead the air past the charge cooler 12 when the charging pressure has to be built up in the cylinders 9. This is particularly advantageous when cold starting vehicles in which the charging air is cooled by water. A bypass line may be used to shorten the air path to the cylinders 4 and at the same time reduce both pressure drop and cooling effect.

The control device 26 should also be connected to a second sensoring device 29 which detects the voltage of the vehicle battery 30. It is thus possible to have the engine 2 start without running the electric motor 22 when the battery voltage is low, with the object of reducing the risk of the electrical machine 22 discharging the battery 30, which would result in insufficient voltage being available for starting the engine. In certain embodiments the electric motor 22 may be controlled so as to operate only so long as the battery voltage can be maintained above a predetermined level.

For the same reason, a time circuit may also be used to supplement a temperature sensor, with the object of starting the engine 2 after a predetermined time, e.g. 10 seconds, even if sufficient temperature is not registered. There would otherwise be the risk of the electric motor 22 driving the compressors 18, 19 for too long a time if faults occurred in the pressure sensor 28, the inlet pipe 8 or any other element.

It may also be advantageous to use the electrical machine 22 conventionally in other operating situations in which increased charging pressure is desired, e.g. during acceleration from low engine speed, since the turbo compressor 18 cannot create sufficient charging pressure in the initial stage when the exhaust gas flow is low. The electrical machine 22 may also be used as a generator in operating situations in which the compressors create sufficient charging pressure to charge the battery 30 or to drive certain auxiliary units such as windscreen wipers, compressed air reservoirs for the brakes or the like.

The electrical machine should also have a power output of 5–10 kW for the application according to the invention, which in most cases is less than the power required in the other areas of application described above. Thus an existing machine already known today is probably usable for the application according to the invention.

The embodiments described above have no limiting effect upon the invention, which may be implemented according to a multiplicity of alternative embodiments which involve similar problems or requirements, such as industrial engines. Engines without turbo units may also be used if the compressor is placed on the intake pipe. The compressor may also be replaced by any other compressed air device, such as for example a compressed air reservoir which is charged during operation and from which the pressure built up is led into the cylinders on the occasion of the next start.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Arrangement in a vehicle having an internal combustion engine incorporating at least one combustion chamber for supplying compressed air to the chamber before starting the engine, which arrangement comprises:

at least one inlet duct connected to the cylinder;

at least one compressed air device connected to the inlet duct, the compressed air device comprising a compressor which has as a drive source an electric motor which receives signals from the activating device; the electric motor being the sole drive source of the compressor and the compressor being arranged in series with a second compressor which forms part of a turbo unit of the internal combustion engine;

an activating device for supplying an activation signal;

a control device responsive to the activation signal for causing the compressed air device to provide the combustion chamber with pressurized air; and a sensing device for sensing at least one parameter which represents directly or indirectly the temperature in the inlet duct and whose value changes from the time the compressed air device begins to supply the combustion chamber with compressed air, the control device being connected to the first sensing device for providing a signal for starting the internal combustion engine when the sensing device detects that a predetermined value of the parameter is reached.

2. Arrangement according to claim 1, wherein the activation device is an ignition lock.

3. Arrangement in a vehicle having an internal combustion engine incorporating at least one combustion chamber for supplying compressed air to the chamber before starting the engine, which arrangement comprises:
- at least one inlet duct connected to the cylinder;
- at least one compressed air device connected to the inlet duct;
- an activating device for supplying an activation signal;
- a control device responsive to the activation signal for causing the compressed air device to provide the combustion chamber with pressurized air;
- a first sensing device for sensing at least one parameter which represents directly or indirectly the temperature in the inlet duct and whose value changes from the time the compressed air device begins to supply the combustion chamber with compressed air, the control device being connected to the first sensing device for providing a signal for starting the internal combustion engine when the first sensing device detects that a predetermined value of the parameter is reached; and
- a second sensing device connected to the control device which detects the voltage level of a battery in the vehicle, the control device controlling the compressed air device in accordance with the voltage level of the battery.

4. Arrangement according to claim 3, wherein the first sensing device is a temperature sensor which is arranged to detect the temperature in the inlet duct.

5. Arrangement according to claim 3, wherein the first sensing device detects that a predetermined time has elapsed since the activation device caused the compressed air device to provide the combustion chamber with pressurized air.

6. Arrangement according to claim 3, wherein the compressed air device comprises a compressor which has as a drive source an electric motor which receives signals from the activating device.

7. Arrangement according to claim 6, wherein the engine includes a turbo unit and the compressor forms part of the turbo unit.

8. Arrangement according to claim 7, wherein the activation device is an ignition lock.

9. Arrangement according to claim 6, wherein the electric motor is the sole drive source of the compressor and the compressor is arranged in series with a second compressor which forms part of a turbo unit of the internal combustion engine.

10. Arrangement according to claim 9, wherein the activation device is an ignition lock.

11. Method for starting a vehicle internal combustion engine incorporating at least one combustion chamber connected to at least one inlet duct for receiving compressed air from at least one compressed air device, the internal combustion engine being arranged to be started udder the action of an activating device, which method comprises the steps of:
- transmitting a signal to the compressed air device when the activating device is operated to cause the compressed air device to supply the combustion chamber with pressurized air via the inlet duct;
- detecting the temperature in the inlet duct whose value changes from the time the compressed air device begins to supply the combustion chamber with compressed air;
- providing a signal for starting the internal combustion engine when a predetermined value of the temperature is reached; and
- detecting the time which has elapsed since the signal to the compressed air device for supplying compressed air to the combustion chamber has been transmitted, the signal for starting the internal combustion engine being transmitted when a predetermined time has elapsed.

12. Method for starting a vehicle internal combustion engine incorporating at least one combustion chamber connected to at least one inlet duct for receiving compressed air from at least one compressed air device, the internal combustion engine being arranged to be started under the action of an activating device, which method comprises the steps of:
- transmitting a signal to the compressed air device when the activating device is operated to cause the compressed air device to supply the combustion chamber with pressurized air via the inlet duct;
- detecting a predetermined parameter which represents directly or indirectly the temperature in the inlet duct and whose value changes from the time the compressed air device begins to supply the combustion chamber with compressed air;
- providing a signal for starting the internal combustion engine when the predetermined value of the parameter is reached
- detecting the voltage level in a battery in the vehicle; and;
- transmitting a signal to the compressed air device when the activating device is operated if the voltage level exceeds a predetermined value.

13. Method according to claim 12, wherein the parameter is the temperature in the inlet duct.

14. Method according to claim 13, wherein the time which has elapsed since the signal to the compressed air device for supplying the compressed air to the combustion chamber was transmitted is detected and the signal for starting the internal combustion engine is transmitted when a predetermined time has elapsed.

* * * * *